United States Patent
Takeuchi

[11] 3,871,006
[45] Mar. 11, 1975

[54] AUTOMATIC DIAPHRAGM SETTING APPARATUS FOR CAMERA

[75] Inventor: Hideo Takeuchi, Kozakai, Japan

[73] Assignee: Minolta Camera Kabushiki Kaisha, Higashiku, Osaka, Japan

[22] Filed: Sept. 12, 1973

[21] Appl. No.: 396,655

[30] Foreign Application Priority Data
Sept. 18, 1972 Japan.............................. 47-108890

[52] U.S. Cl....................... 354/40, 354/44, 354/271
[51] Int. Cl.............................................. G03b 9/04
[58] Field of Search ... 95/10 C, 10 CD, 64 R, 64 D; 354/40, 42, 43, 44, 270, 271

[56] References Cited
UNITED STATES PATENTS

| | | | |
|---|---|---|---|
| 3,000,281 | 9/1961 | Rentschler | 95/64 D X |
| 3,027,818 | 4/1962 | Lee et al. | 95/10 C |
| 3,078,773 | 2/1963 | Egger | 95/10 C |
| 3,116,659 | 1/1964 | Waroux | 95/64 D X |
| 3,116,673 | 1/1964 | Bogopolsky | 354/42 |
| 3,299,789 | 1/1967 | Chandler et al. | 95/64 R |
| 3,379,107 | 4/1968 | Liesen et al. | 95/64 R X |
| 3,491,664 | 1/1970 | Ernisse | 95/10 CD |
| 3,554,103 | 1/1971 | Harvey | 95/64 R |
| 3,614,919 | 10/1971 | Douglas | 95/64 R X |

*Primary Examiner*—Joseph F. Peters, Jr.
*Attorney, Agent, or Firm*—Wolder & Gross

[57] ABSTRACT

A camera automatic diaphragm control includes an electromagnet operable under the control of a known electric circuit for detecting the brightness of a subject when the shutter is tripped and a diaphragm setting member supported and spring biased in one direction so as to turn along the attracting face of the electromagnet and to operate a diaphragm blade directly when so turned. After the shutter has been tripped, the diaphragm setting member is freed from its cocked position so as to turn in the biased direction and turns under the control of the electromagnet to determine the size of the diaphragm aperture.

2 Claims, 2 Drawing Figures

AUTOMATIC DIAPHRAGM SETTING APPARATUS FOR CAMERA

BACKGROUND OF THE INVENTION

The present invention relates to an automatic diaphragm setting apparatus for cameras, more particularly to an apparatus for automatically setting the diaphragm aperture before the shutter is opened and closed when the shutter is tripped.

An automatic diaphragm apparatus has heretofore been provided which is so constructed that a known electric circuit for detecting the brightness of a subject controls the timing for energizing an electromagnet and the operation signal of the electromagnet is mechanically delivered to diaphragm setting means to determine the diaphragm aperture size of the camera objective lens. Such apparatus needs several members including a transmitting member, coupling member and the like which serve as means for mechanically transmitting the operation signal to a diaphragm member and therefore entails the drawback that it is complex in construction and requires a greater space for installation. Thus the known apparatus is not suitable for use especially in inexpensive miniature cameras.

SUMMARY OF THE INVENTION

An object of this invention is to provide an automatic diaphragm setting apparatus which is extremely simple in construction and which can be installed in a very small space.

Another object of this invention is to provide an automatic diaphragm setting apparatus adapted for use especially in inexpensive miniature cameras.

The present invention provides an apparatus comprising an electromagnet operable under the control of a known electric circuit for detecting the brightness of a subject when the shutter is tripped and a diaphragm setting member supported and spring biased in one direction so as to be turnable along the attracting face of the electromagnet. The diaphragm setting member is in engagement with a diaphragm blade to directly operate the diaphragm blade when turned. After the shutter has been tripped, the diaphragm setting member is released from its cocked position so as to turn in th biased direction and turns under the control of the electromagnet to determine the size of diaphragm aperture.

According to this invention, the diaphragm setting member, controlled by the electromagnet directly, operates the diaphragm blade directly, so that there is no need to provide a transmitting member, coupling member and other various members conventionally used to set the diaphragm automatically. This greatly simplifies the construction and sharply reduces the space needed for installation. Accordingly the apparatus can be manufactured at a low cost and is most suitable for use in inexpensive miniature cameras.

Other objects and features of this invention will become apparent from the following descpription.

DESCRIPTION OF THE PREFERRED EMBODIMENTS

Figure 1:
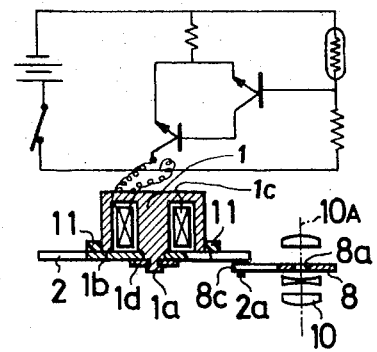
FIG. 1 is a plan view partly in section showing the principal parts of an embodiment of this invention.
Figure 2:
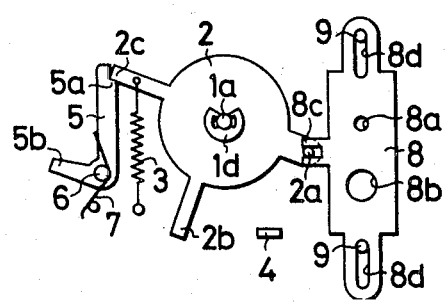
FIG. 2 is a front view of the embodiment of FIG. 1.

With reference to the embodiment shown in FIGS. 1 and 2, an electromagnet 1 fixedly disposed within an unillustrated camera body is controlled by a known electric circuit for detecting the brightness of a subject. If the brightness of the subject is higher than a specified value, current is supplied to the electromagnet winding 1c upon tripping the shutter to energize the electromagnet, but if the brightness is below the specified value the current will not flow through the winding in spite of tripping of the shutter, leaving the magnet 1 unenergized.

The electromagnet 1 is provided, approximately at the center of its electromagnetic attracting face 1b, with a projecting pin 1a which pivotally supports a diaphragm setting member 2 in the form of a disc made of a magnetically attractable material. The member 2 is rotatably movable along the attracting face 1b and is retained in position by a snap ring 1d.

The diaphragm setting member 2 is urged by a spring 3 in a counterclockwise direction, with its arm 2b positioned in the path of leftward movement of a cocking member 4. When moved leftward by a shutter cocking action, the cocking member 4 pushes the arm 2b and turns the member 2 in a clockwise direction, tensioning the spring 3. When the diaphragm setting member 2 reaches the position shown in FIG. 2, a projection 2c of the member 2 engages a stepped portion 5a of a latch member 5, whereby the member 2 is latched in its cocked position.

The latch member 5, pivoted by a pin 6 to the camera body and biased by a spring 7 in a clockwise direction has an arm 5b positioned in the path of advance of an unillustrated shutter release member, so that when the shutter is tripped, the arm 5b is depressed and the latch member 5 is thereby turned in a counterclockwise direction. Consequently, the latch member 5 frees the diaphragm setting member 2 from its cocked position and permits its rotation in a counterclockwise direction. This unlatching is effected after the circuit switch (not shown) for the winding 1c of the electromagnet 1 has been closed.

The diaphragm setting member 2 further has a pin 2a engaged by a yoke portion 8c formed in a diaphragm blade 8. Accordingly, the turning of the diaphragm setting member 2 drives the diaphragm blade 8.

The diaphragm blades 8 has two diaphragm apertures, namely a small diaphragm aperture 8a which is positioned on the optical axis 10A of the camera objective lens 10 when the brightness of the subject is higher than the specified value, and a large diaphragm aperture 8b which is positioned on the optical axis 10A when the subject has a lower brightness. The diaphragm blade 8 is movable up and down by virtue of turning of the diaphragm setting member 2 while being longitudinally slideably restricted by guide pins 9 engaged by upper and lower vertical slots 8d.

When the diaphragm setting member 2 is latched at its cocked position, the diaphragm blade 8 has its small diaphragm aperture positioned on the optical axis 10A of the taking lens 10.

FIG. 2 shows the foregoing construction after the shutter has been completely cocked, with the diaphragm setting member 2 retained in its cocked position.

When the shutter is tripped in FIG. 2, the power source switch of the electric circuit is closed, and if it is detected that the brightness of subject is higher than the specified level, the electromagnet 1 is energized to hold the diaphragm setting member 2 attracted thereto. Subsequently, the latch member 5 is turned in a counterclockwise direction by the arm 5b being depressed by the unillustrated release member to disengage the diaphragm setting member 2 from the stepped portion 5a by which it is retained in its cocked position. However, the setting member 2 is still held attracted by the electromagnet 1 and prevented from counterclockwise movement by the spring 3 to hold the diaphragm blade 8 in the position of FIG. 2. The small diaphragm aperture 8a is therefore located on the optical axis 10A of the lens 10. In other words, the diaphragm maintains the aperture that is suitable to photograph subjects having a brightness higher than the specified level.

The retaining force F by which the diaphragm setting member 2 is held attracted to the electromagnet 1 against the spring tension acting thereon and by which it is retained electrically, is a product $\mu F_o$ of the attracting force $F_o$ of the electromagnet 1 multiplied by a frictional force $\mu$ acting between the attracting surface 1b and the surface of the setting member 2 in contact therewith. To permit the diaphragm setting member 2 to be held attracted to the magnet against the action of the spring 3, the product $\mu F_o$ must be greater than the tension of the spring 3.

Conventionally, the electromagnet 1 and the diaphragm setting member 2 are rough-surfaced to assure contact under the attraction. This may be useful to increase the frictional force $\mu$ but involves the contradiction that the attracting force $F_o$ will be reduced and might possibly mitigate the retaining force $\mu F_o$. To overcome such objection, the contact surfaces are made smooth to increase the attracting force $F_o$ to the greatest possible extent. If necessary, a friction member 11 such as rubber having a great coefficient of friction is fixedly disposed around the electromagnet 1 as seen in FIG. 1 so that the diaphragm setting member 2 in its attracted position will be in intimate contact with the friction member 11 to increase the retaining force $\mu F_o$.

On the other hand, if the electric circuit detects that the subject has a brightness lower than the specified level, the current will not be supplied to the electromagnet 1 and the magnet 1 remains unenergized. Consequently, the latch member 5 turns in a counterclockwise direction after the main switch of the electromagnet has been closed, freeing the diaphragm setting member 2 from its cocked position to cause the spring 3 to turn the member 2 in a counterclockwise direction. The pin 2a therefore shifts the diaphragm blade 8 upward to locate the large diaphragm aperture 8b on the optical axis 10A of the taking lens 10, whereby the diaphragm is adapted to photograph the dark subject.

According to the embodiment described, the diaphragm setting member 2 and diaphragm blade 8 are provided separately and are operatively associated by the engagement of the pin 2a with the yoke portion 8c. Alternatively, the diaphragm setting member 2 may be formed with diaphragm apertures to be positioned on the optical axis 10A of the taking lens 10 so as to be serviceable also as the diaphragm blade. Conversely, an unillustrated intermediate member may in interposed between the diaphragm setting member 2 and the diaphragm blade 8 to operatively connect both the members 2 and 8. These modifications in design can be made very easily. In changing the diaphragm aperture in accordance with the brightness of the subject, the small aperture is changed to the large aperture in the embodiment described, but the electric circuit may conversely be such that the large aperture will be changed to the small aperture depending on the brightness of the subject.

Although the embodiment described has such construction that the pin 1a serving as the center for the rotation of the diaphragm setting member 2 and projects approximately from the center of the electromagnet 1, the center of rotation of the diaphragm setting member 2 need not necessarily be provided on the attracting faces of the electromagnet 1 but may be disposed otherwise without any objection.

It is also effective to roughen the attracting surface of the electromagnet 1, or the attracted surface of the diaphragm setting member 2 as by knurling so as to render the opposing surfaces engageable with each other and to thereby provide a greater retaining force than is afforded simply by the frictional force, in opposition to the tension of the spring 3.

What is claimed is:

1. An automatic diaphragm setting apparatus in a camera comprising:

means including an electric circuit having a current source and a photoelectric cell for detecting the brightness of a subject and producing an on or off electric signal;

an electromagnet including a stationary iron core having a planar attracting face and a stationary coil connected to the electric circuit, said electromagnet being energized in response to the photoelectric cell of the electric circuit detecting subject brightness below a predetermined value and deenergized in response to the photoelectric cell detecting subject brightness above said predetermined value;

a diaphragm setting member pivoted at the center of the electromagnet and rotatable on the planar attracting face of the electromagnet and spring urged to rotate from a cocked first position to a released second position at the time of the camera shutter release, said diaphragm setting member remaining attracted and retained in the first position when the electromagnet is energized and moving to the second position when the electromagnet is deenergized;

a diaphragm member having a smaller first aperture and a larger second aperture and being movable across an optical axis of an objective lens in relation to the diaphragm setting member, said first aperture being positioned on the optical axis of the objective lens when the diaphragm setting member is in the first position and said second aperture being positioned on the optical axis of the objective lens when the diaphragm setting member is in the second position.

2. The automatic diaphragm setting apparatus as set forth in claim 1 wherein an aperture is provided approximately at the center of said diaphragm setting member and including a pivot pin in engagement with said aperture approximately at the center of said electromagnet.

* * * * *